United States Patent [19]

Sawtelle, Jr.

[11] Patent Number: 5,680,278

[45] Date of Patent: Oct. 21, 1997

[54] APPARATUS FOR COMBINING LINEAR AND ROTATIONAL MOTION OF AN AZIMUTH READ/WRITE HEAD

[75] Inventor: Homer J. Sawtelle, Jr., Manchester, N.H.

[73] Assignee: Quantum Corporation, Milpitas, Calif.

[21] Appl. No.: 694,951

[22] Filed: Aug. 8, 1996

[51] Int. Cl.⁶ .................. G11B 5/55; G11B 21/08
[52] U.S. Cl. .......................................... 360/106
[58] Field of Search .............................. 360/106

[56] References Cited

U.S. PATENT DOCUMENTS

| | | | |
|---|---|---|---|
| 4,110,803 | 8/1978 | Townsend | 360/106 |
| 4,268,881 | 5/1981 | Saito | 360/109 |
| 4,510,543 | 4/1985 | Ohta et al. | 360/106 |
| 4,539,615 | 9/1985 | Arai et al. | 360/121 |
| 4,586,098 | 4/1986 | Pretto | 360/109 |
| 4,609,958 | 9/1986 | Irvin et al. | 360/106 |
| 4,609,959 | 9/1986 | Rudi | 360/106 |
| 4,616,280 | 10/1986 | Kobayashi et al. | 360/109 |
| 4,831,615 | 5/1989 | Goto et al. | 360/106 |
| 4,833,558 | 5/1989 | Baheri | 360/106 |
| 5,448,438 | 9/1995 | Kasetty | 360/106 |

*Primary Examiner*—Robert S. Tupper
*Attorney, Agent, or Firm*—John C. Chen

[57] ABSTRACT

A mechanism and method for providing rotational and linear movement to an azimuth tape recording head is disclosed. The mechanism includes a toothed gear upon which the read/write head is mounted. Two identical threaded shafts, each extending from identical stepper motors are mounted on a base, along a same vertical plane as the toothed gear. Rotational axes of the threaded shafts are arranged in a parallel relation such that each is meshably engaged to the toothed gear on opposing sides. Rotational movement of the head is achieved by synchronously rotating the threaded shafts, at the same speed, in opposite directions. Linear movement, or lifting/lowering, of the head is achieved by synchronously rotating one threaded shaft in one direction and the other threaded shaft in the opposite direction.

20 Claims, 7 Drawing Sheets

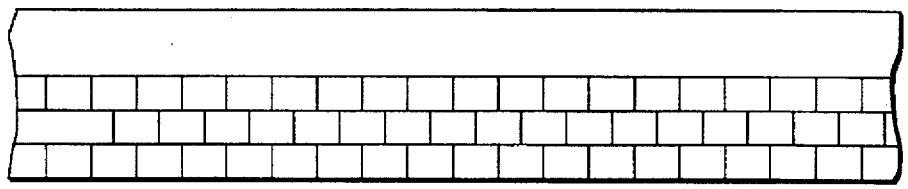
FIG.—1c
(PRIOR ART)
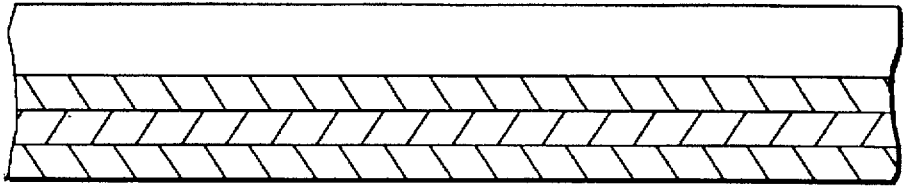
FIG.—1b
(PRIOR ART)
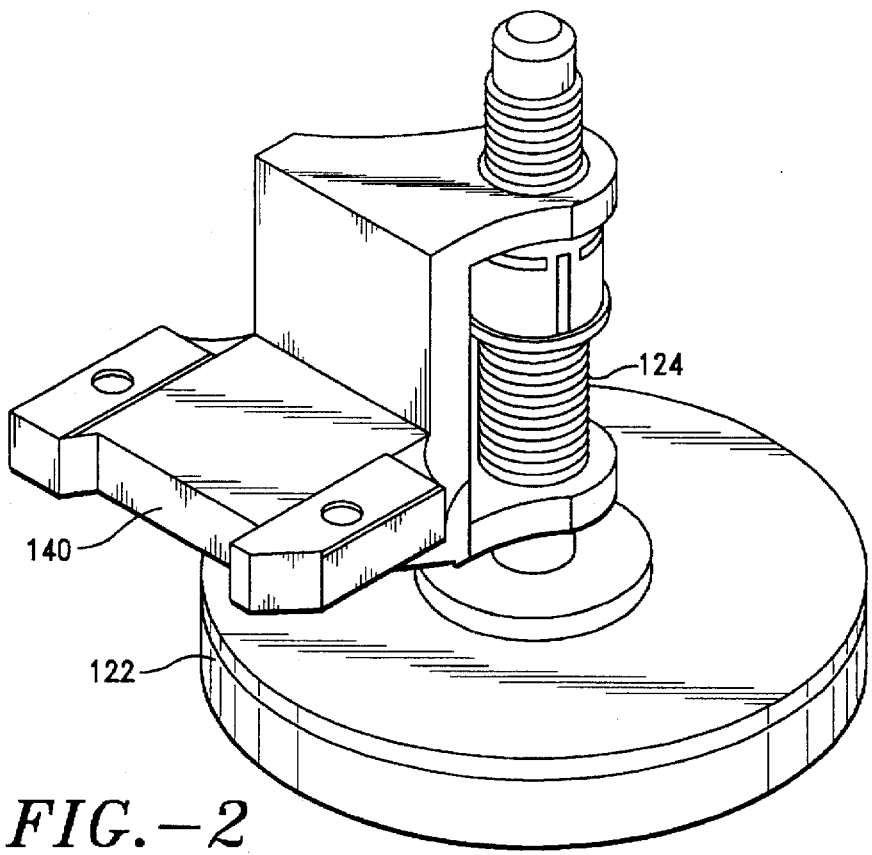
FIG.—2
(PRIOR ART)

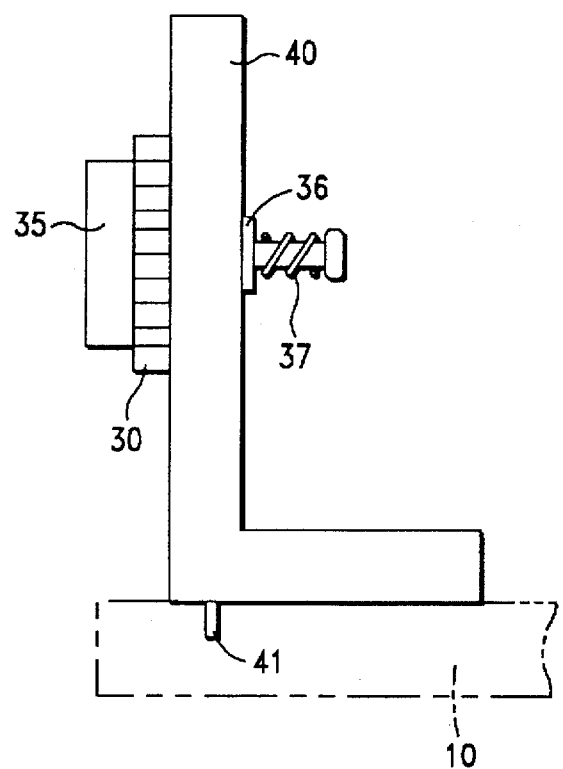
FIG.—7a
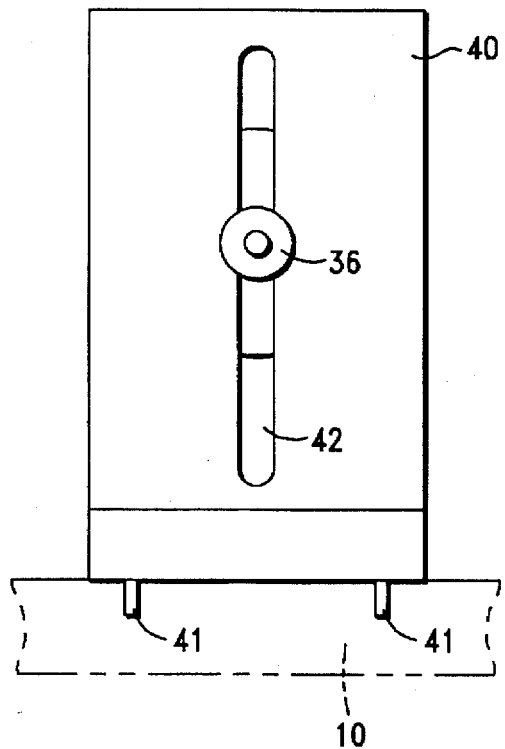
FIG.—7b

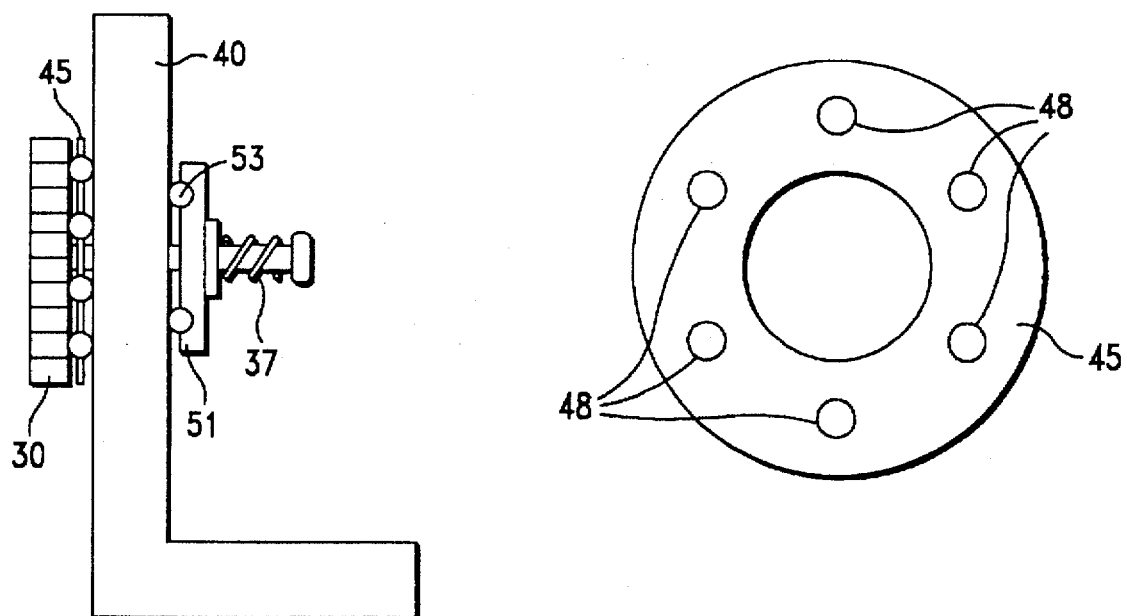
FIG.-8a
FIG.-8b
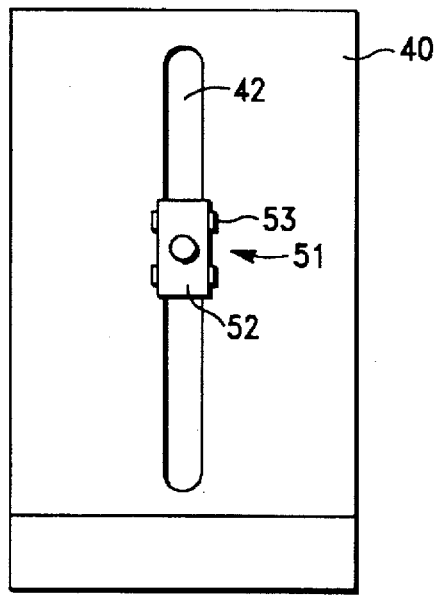
FIG.-8c

APPARATUS FOR COMBINING LINEAR AND ROTATIONAL MOTION OF AN AZIMUTH READ/WRITE HEAD

FIELD OF THE INVENTION

The present invention relates generally to positioning a magnetic tape recording head relative to a recording tape. More particularly, the present invention relates to an apparatus which provides both vertical and rotary motion for positioning an azimuth recording head.

BACKGROUND OF THE INVENTION

The constantly increasing operational speeds of digital computers is creating a demand for corresponding increases in the data storage capacities of magnetic tape recording and reproducing systems, while maintaining the special requirements of high speed digital tape systems.

In linear recording, tape drives run the tape past a plurality of stationary heads at e.g. 100 to 150 inches per second during read/write data transfer operations, and faster during block searching. Data is recorded on longitudinal tracks lying parallel to each other and to the tape edge, while magnetization directions lie perpendicular to the tracks, as shown in FIG. 1b. Linear recording offers the advantages of backwards compatibility, i.e. being able to read/write in either direction of tape travel, high data transfer rate and a simple head actuator assembly, i.e. requiring only one degree of freedom of direction. One example of a prior head structure for use with digital linear magnetic tape is provided by commonly assigned U.S. Pat. No. 5,055,959 entitled: "Tape Head with Low Spacing Loss Produced by Narrow and Wide Wear Regions", and by commonly assigned U.S. Pat. No. 5,475,553 entitled: "Magnetic Tape Head with Self-Regulating Wear Regions", the disclosures thereof being incorporated herein by reference thereto. One drawback of linear recording is the resulting inter-track crosstalk, which requires guard band spaces between tracks or wide write heads, thereby decreasing track density.

Azimuth recording is a linear recording method which offers the benefits of backwards compatibillity while eliminating the need for guard band spaces, thereby increasing track density. Data is recorded on longitudinal tracks lying parallel to each other and the tape edge. However, the data magnetization directions of adjacent data tracks lie at different azimuth angles from each other. Such a recording pattern is illustrated in FIG. 1c. One example of a prior art head structure for use with azimuth magnetic tape recording is provided by commonly assigned U.S. Pat. No. 5,523,904 entitled: "Linear Tape Write Servo Using Embedded Azimuth Servo Blocks", the disclosure thereof being incorporated herein by reference thereto.

To achieve the azimuth recording pattern of FIG. 1c, a motor is generally required to rotatably position a magnetic read/write head at a given azimuth angle, relative to a given track, while a separate motor, e.g. stepper motor, linearly positions the read/write head from one track to another.

For example, commonly assigned U.S. Pat. No. 5,448,438 to Kasetty discloses an apparatus for providing linear movement to a read/write head, in a direction perpendicular to the direction of tape travel. As shown in FIG. 2, platform 140 is threadably engaged with a threaded output shaft 124 of a stepper motor 122. As the shaft 124 rotates, the platform 140 may be "raised" or "lowered", assuming the shaft to be in a vertical orientation, positioning the head from one track to another within a longitudinal tape recording system.

U.S. Pat. No. 4,539,615 to Arai et al. discloses an azimuth recording apparatus for providing rotational movement to a read/write head. As shown in FIG. 3, the read/write head 144 is mounted to an output shaft 145 of a stepper motor 147. As the shaft 145 rotates, the azimuth angle of the recording gaps are accordingly rotated. To achieve both head lift and rotation in one assembly, the assignees of the present invention proposed to mount a head rotating mechanism with the head lifting mechanism shown in FIG. 2, as disclosed in commonly assigned U.S. patent application Ser. No. 08/557,662, the disclosure thereof being incorporated herein by reference.

The main drawback of such an integrated assembly, is that it was physically constrained from fitting into smaller tape drives. In addition, the cost and complexity of fabricating such an integrated assembly was time consuming and expensive. For instance, the number and complexity of parts required increases assembly time, the robustness of such a system created vibration and shock problems, and the non-symmetry of such a design eliminates use of duplicate parts.

Thus, there exits a hitherto unsolved need for an improved, simple and cost efficient mechanism which performs both head lift and rotation of an azimuth recording head.

SUMMARY OF THE INVENTION WITH OBJECTS

A general object of the present invention is to provide an azimuth read/write head actuator assembly which overcomes the limitations and drawbacks of the prior art.

Specifically, an object of the present invention is to provide an apparatus for providing rotary and linear movement to an azimuth read/write head in a simple compact assembly.

These and other objects are achieved in an assembly comprising two stepper motors, each having a threaded output shaft, an L-shaped bracket and a worm gear whereupon the read/write head is mounted. The threaded shafts are positioned in parallel arrangement with the worm gear threadably engaged therein between. The spur gear is mounted to the L-shaped bracket in a manner which enables the gear to rotate and translate along an elongated slot defined in the L-shaped bracket. Rotational movement of the head is achieved by synchronously rotating one threaded shaft in one direction and rotating the other threaded shaft in the other direction. Linear movement along the elongated slot is achieved by synchronously rotating both threaded shafts in the same direction.

These and other features and advantages of the present invention will be apparent to those skilled in the art upon reference to the following description of preferred embodiments thereof.

BRIEF DESCRIPTION OF THE DRAWINGS

In the Drawings:

FIGS. 1b is an illustration of linear recording pattern.

FIGS. 1c is an illustration of azimuth recording pattern.

FIG. 2 is an enlarged isometric view of a prior art head lifting mechanism.

FIG. 7a is a side elevation view, partly in section, of the L-shaped bracket of FIG. 4, showing the mounting arrangement of the tape head and spur gear.

FIG. 7b is a side elevation view of the L-shaped bracket of FIG. 4, showing the elongated slot which enables the tape head and spur gear linear movement.

FIG. 8a is a side elevation view, partly in section, of an alternative method of mounting the spur gear to the L-shaped bracket, to overcome a high spring constant to provide smooth vertical and rotational movement.

FIG. 8b is a side elevation view, of a disk shaped bearing assembly of FIG. 8a, enabling smooth vertical and rotational movement to the tape head.

FIG. 8c is side elevation view of a carriage-like assembly of FIG. 8a, enabling smooth movement in the vertical direction.

DETAILED DESCRIPTION OF PREFERRED EMBODIMENTS

Figure 3:
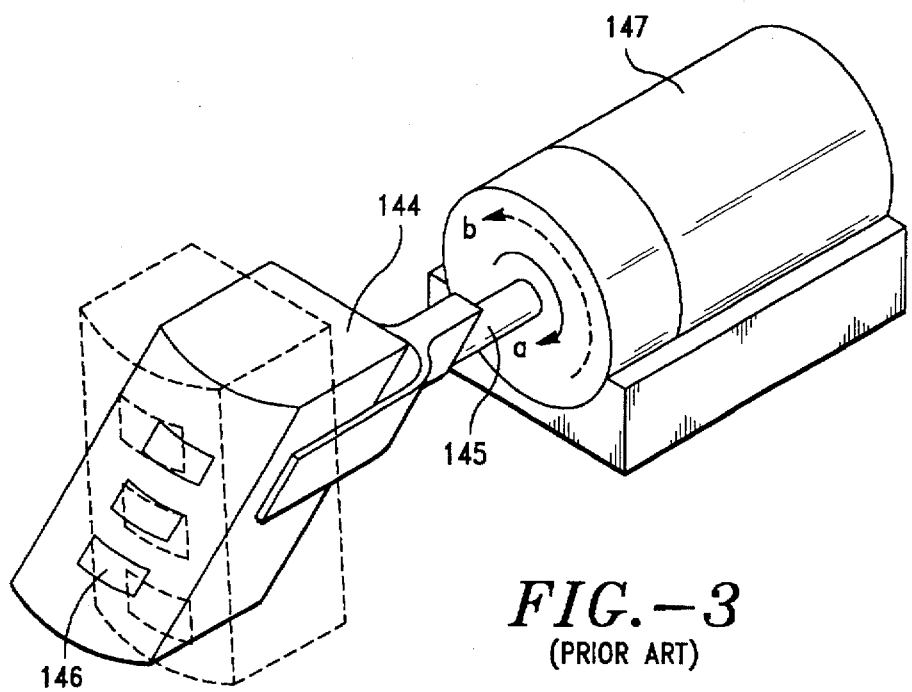
FIG. 3 is an enlarged isometric view of a prior art head tilting mechanism.
Figure 4A:
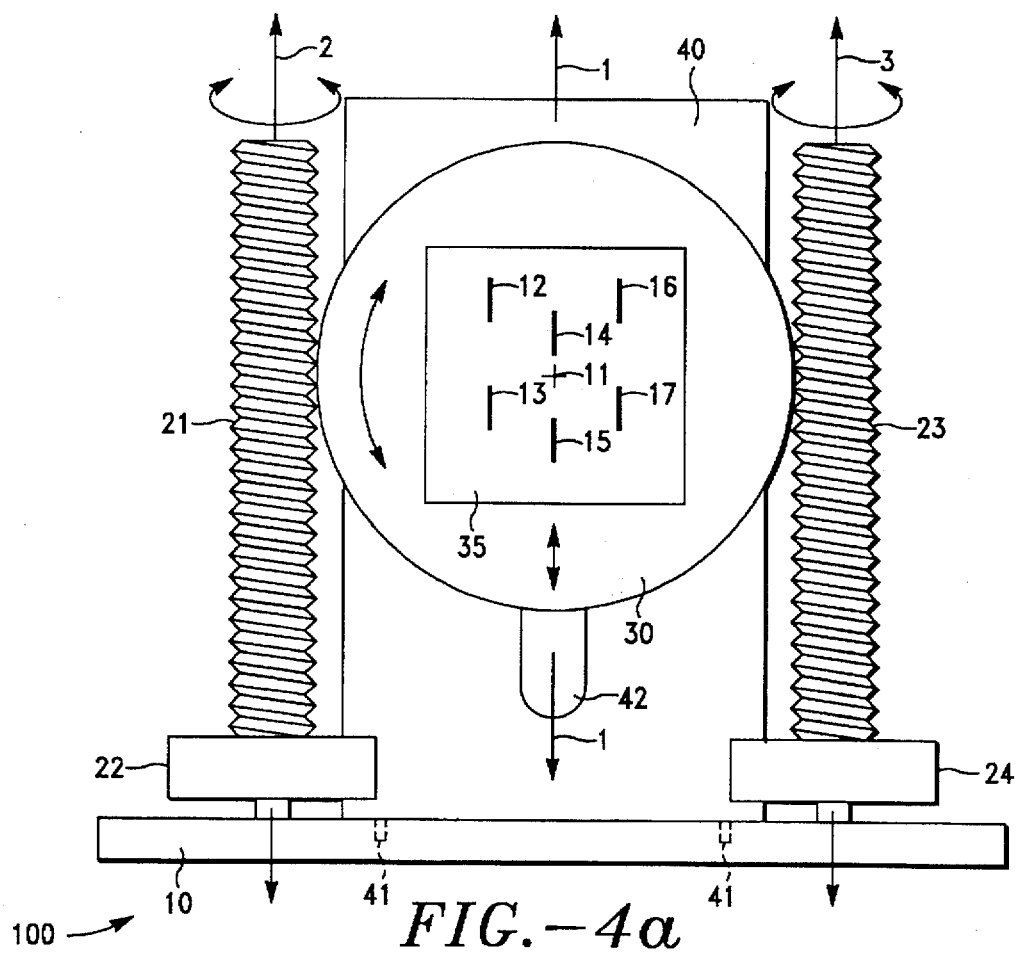
FIGS. 4a and b are views of a tape head lift/tilt actuator in accordance with principles of the present invention.

FIG. 4 shows a tape head actuator 100 for lifting/lowering and rotating a read/write head 35 in accordance with principles of the present invention. The actuator 100 includes two identical stepper motors 22 and 24 and two identical rotating threaded shafts or lead screws 21 and 23 extending therefrom, respectively. The motors 22 and 24 are mounted to a base 10, along with a bracket 40, preferably L-shaped for stability. More specifically, each motor and lead screw is mounted on either side of the bracket 40, in a symmetrical manner. A rotational axis 2 of lead screw 21 is substantially parallel to a rotational axis 3 of lead screw 23.

A toothed gear 30, e.g. spur gear, is mounted to the bracket 40 along an elongated slot 42. A midline of the slot 42 coincides with a mid line 1 of the bracket. The midline of the slot is also substantially parallel to the axes of rotation of lead screws 21 and 23, enabling gear 30 to mesh with both lead screws 21 and 23. Thus, the bracket 40 and the motors 22 and 24 are preferably mounted in an orientation which enables the rotational axes of lead screws 21 and 23, and a plane of vertical motion of the gear 30, to lie substantially in a same vertical plane.

A read/write head 35 is further mounted to the gear 30 so that an axis of rotation 11 of the head 35 coincides with an axis of rotation of the screw 30. As shown in FIG. 4, the head 35 includes write head gaps 12, 13, 16 and 17 and read head gaps 14 and 15. The head gaps are arranged in a pattern to enable azimuth reading/writing in either direction of tape travel, as will be explained later.

As shown in FIGS. 7a and 7b, the gear 30 and head 35 are mounted through the elongated slot 42 in the bracket 40 using a washer 36 and helical spring 37 assembly. The spring 37 is characterized by a spring constant which preferably is sufficient to isolate the gear 30 from sudden shock forces, but not too great as to prevent smooth linear and rotational movement. To reduce friction between the washer 36 and bracket 40, as well as between the gear 30 and the bracket 40 the area around the elongated slot 42, on both sides of the bracket, may be coated with a suitable lubricant. Also shown in FIGS. 4 and 7a, bracket 40 may include locating pins 41, which are inserted into locating holes defined in the base 10.

It should be understood that while the elongated slot 42 is the preferred technique for moveably mounting the gear 30 to the bracket 40, other techniques are conceivable and are considered within the scope of the present invention. For example, vertical channel shaped guides, encasing each lead screw may be utilized to ensure that the screw 30 travels along a vertical plane.

Figure 5A:
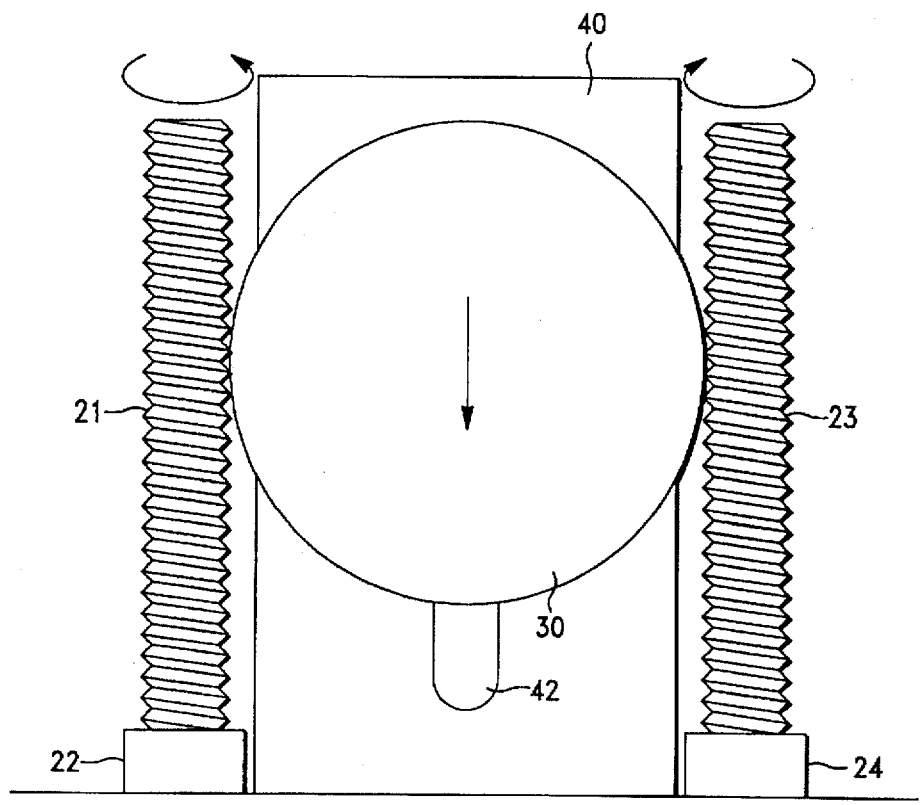
FIGS. 5a and 5b are side elevation views of the tape head actuator of FIG. 4, illustrating the direction of synchronous rotation of the threaded shafts to achieve rotational movement of the tape head
Figure 5B:
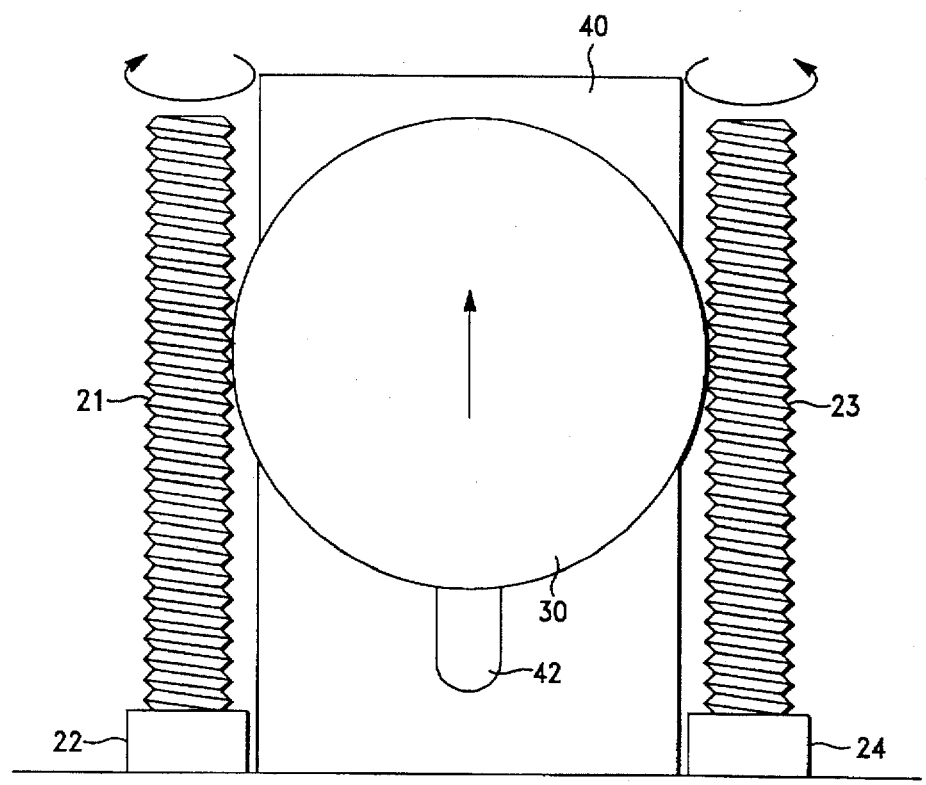

During operation, the stepper motors 22 and 24 are synchronously driven by a single clock, enabling synchronous rotation. The head 35 and gear 30 may be rotated or translated along the vertical plane depending on the direction of rotation of the two lead screws 21 and 23. When both stepper motors 22 and 24 are rotated in the same rotational direction at the same speed, the meshed spur gear 30 acts as a beam which is lifted (or lowered) parallel to the baseplate 10. As shown in FIG. 5a, synchronously rotating the lead screws 21 and 23 in the counter clockwise direction (as shown by the arrow) lowers the gear 30. Alternatively, synchronously rotating the lead screws in the clockwise direction lifts the gear 30, as shown in FIG. 5b. In both instances, the gear 30 remains rotationally stationary while the gear 30 is lifted/lowered.

Figure 6A:
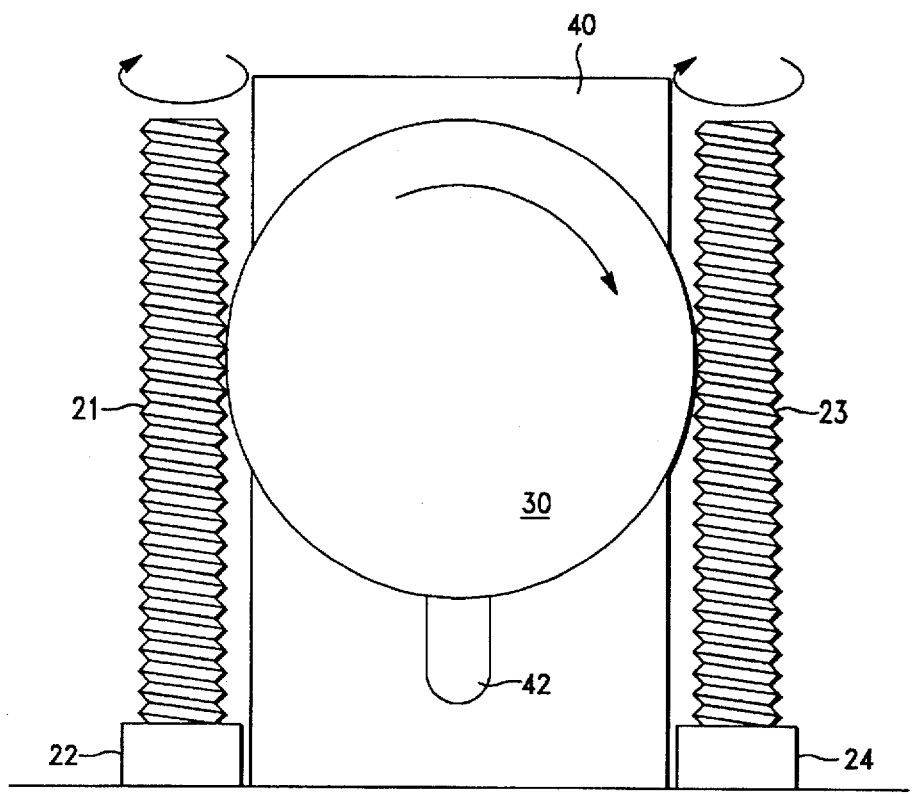
FIGS. 6a and 6b are side elevation views of the tape head actuator of FIG. 4, illustrating the direction of synchronous rotation of the threaded shafts to achieve linear movement of the tape head.
Figure 6B:
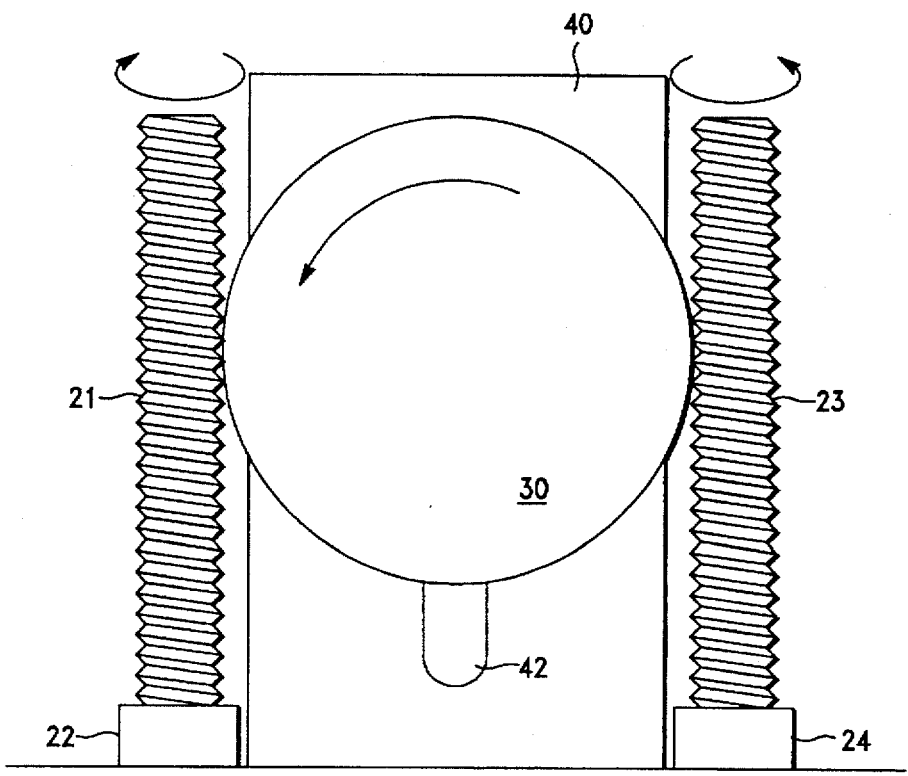

Rotational movement without linear displacement of gear 30 is achieved by synchronously rotating the lead screws 21 and 23 in opposite directions, as illustrated in FIGS. 6a and 6b. As one lead screw applies lifting force to the gear 30, the other screw applies a complimentary downward lowering force to gear 30. The resulting sum of forces applied is that the gear 30 rotates in the forward or reverse direction while its center of rotation remains vertically stationary.

Figure 4B:
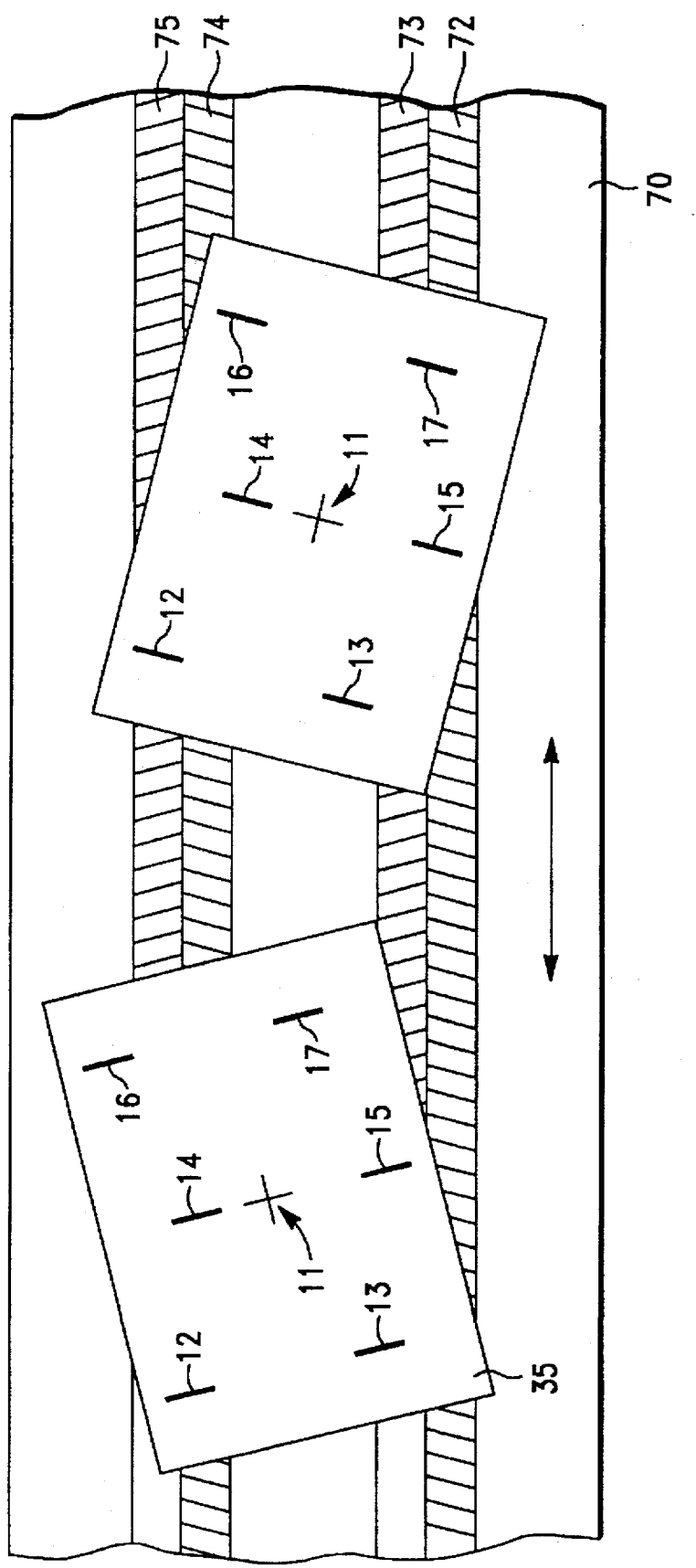

During operation, a longitudinal tape 70, shown in FIG. 4b, travels over the head 35 in either direction, indicated by the arrow. Tracks 72 and 74 may be written in one azimuth angle by rotating the head 35 in the clockwise direction, about its axis of rotation 11, such that head gaps 14 and 16 are positioned over track 74 and gaps 15 and 17 are positioned over track 72. When the end of the tape is reached, recording and reading in the opposite direction is accomplished by rotating the head 35 in the counterclockwise direction and lifting the head 35 to position head gaps 12 and 14 over track 75 and head gaps 13 and 15 over track 75.

In one embodiment, a spring 37 having a high spring constant may be required to overcome significant shock forces. If the required spring constant is so high such that smooth linear and rotational movement of the gear is prevented, the alternative gear mounting arrangement of FIG. 8a may be employed. The arrangement may be employed instead of using a suitable lubricant, as mentioned above. As shown in FIG. 8a, a disk-shaped ball bearing assembly 46 is mounted between the gear 30 and the bracket 40 while a carriage-like assembly 51 is mounted between the spring 37 and the bracket. The ball bearing assembly 45 may include a plurality of ball bearings arranged in a circular pattern, as illustrated in FIG. 8b, to provide both linear and rotational movement to the gear 30. The carriage-like assembly 51, as shown in FIG. 8c, may include a rectangular shaped body 52 and wheels 53 to provide linear travel in the vertical directions. It should be understood that other means of overcoming spring tension to provide smooth rotational and linear movement of the gear may be employed. For instance a ball bearing assembly may be employed instead of the carriage-like assembly 51.

In another embodiment, the assembly 100 may include a servo controller for simultaneously rotating and lifting/lowering the head 35 through incremental displacements. This may be effectuated by rotating one lead screw while maintaining the other lead screw in static state.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A mechanism for rotating and linearly displacing an azimuth read/write head comprising:

a base;

a toothed gear mounted to the read/write head;

means for ensuring that the toothed gear linearly displaces along a vertical plane;

the toothed gear being moveably mounted to the means for ensuring that the toothed gear linearly displaces along a vertical plane;

a first threaded shaft extending from a first motor;

a second threaded shaft extending from a second motor;

the first and second motors being mounted to the base such that a rotational axis of the first shaft is parallel to a rotational axis of the second shaft; and the threaded shafts being meshed with the toothed gear.

2. The mechanism of claim 1 wherein the means for ensuring that the toothed gear linearly displaces along a vertical plane comprises a bracket mounted perpendicular to the base.

3. The mechanism of claim 2 wherein the bracket is L-shaped.

4. The mechanism of claim 2 wherein the bracket further includes an elongated slot defined along a vertical midline of the bracket, the toothed gear being moveably mounted thereabouts.

5. The mechanism of claim 1 wherein the first and second motors are synchronously driven by a single clock.

6. The mechanism of claim 1 wherein rotational movement of the head is achieved by synchronously rotating the first threaded shaft in one direction and the second threaded shaft in the opposite direction.

7. The mechanism of claim 1 wherein linear movement of the head is achieved by synchronously rotating the first and second threaded shafts in the same direction.

8. The mechanism of claim 1 wherein a center of rotation of the read/write head coincides with a center of rotation of the toothed gear.

9. The mechanism of claim 2 wherein the bracket includes means for providing smooth linear and rotational movement to the toothed gear.

10. The mechanism of claim 8 wherein the means for providing smooth linear and rotational movement to the toothed gear comprises a lubricant disposed between the toothed gear and the bracket.

11. The mechanism of claim 8 wherein the means for providing smooth linear and rotational movement to the spur gear comprises a ball bearing assembly moveably biased between the toothed gear and the bracket by a spring.

12. The mechanism of claim 8 wherein the means for providing smooth linear and rotational movement further comprises a carriage-like assembly moveably biased against the bracket by a spring.

13. The mechanism of claim 8 wherein the ball bearing assembly comprises a plurality of ball bearings arranged in a circular pattern about a ring shaped disk.

14. The mechanism of claim 1 wherein the first shaft and the second shaft are defined by a same pitch.

15. The mechanism of claim 1 wherein the first shaft and the second shaft both rotate at a predetermined speed.

16. A method of combining rotational and linear motion of an azimuth read/write head in a tape drive assembly, the method comprising the steps of:

mounting a bracket perpendicular to a base;

mounting a toothed gear to the bracket;

mounting the read/write head to the toothed gear;

providing means for the toothed gear to rotate and linearly translate about the bracket;

providing a first stepper motor including a first lead screw extending therefrom;

mounting the first stepper motor to the base at a location such that the first lead screw engages the toothed gear;

providing a second stepper motor including a second lead screw extending therefrom;

mounting a second stepper motor to the base at an opposite side from the first stepper motor such that a rotational axis of the second lead screw is substantially parallel to a rotational axis of the first lead screw, and the second lead screw engages the toothed gear; and driving the first and second motors synchronously with a single clock.

17. The method of claim 16 further including the step of generating rotational movement to the read/write head by synchronously rotating the first lead screw in one direction and rotating the second lead screw in the other direction.

18. The method of claim 16 further including the step of generating linear movement of the read/write head by synchronously rotating the first and second lead screws in a same direction.

19. The method of claim 17 wherein a center of rotation of the read/write head is vertically stationary during rotational movement.

20. The method of claim 18 wherein a center of rotation of the read/write head is rotationally stationary during linear movement.

\* \* \* \* \*